(12) United States Patent
Ishii et al.

(10) Patent No.: US 8,786,965 B2
(45) Date of Patent: Jul. 22, 2014

(54) DIE PROCESSING METHOD, DIE, OBJECTIVE LENS, AND OPTICAL PICK-UP DEVICE

(75) Inventors: Kenichi Ishii, Uenohara (JP); Kyu Takada, Otsu (JP)

(73) Assignee: Konica Minolta Opto, Inc., Tokyo (JP)

( * ) Notice: Subject to any disclaimer, the term of this patent is extended or adjusted under 35 U.S.C. 154(b) by 41 days.

(21) Appl. No.: 13/498,575

(22) PCT Filed: Aug. 17, 2010

(86) PCT No.: PCT/JP2010/063860
§ 371 (c)(1),
(2), (4) Date: Mar. 27, 2012

(87) PCT Pub. No.: WO2011/040135
PCT Pub. Date: Apr. 7, 2011

(65) Prior Publication Data
US 2012/0182628 A1    Jul. 19, 2012

(30) Foreign Application Priority Data
Sep. 30, 2009  (JP) ................................. 2009-227874

(51) Int. Cl.
*G02B 3/02* (2006.01)
*G02B 3/00* (2006.01)
*G11B 7/1374* (2012.01)

(52) U.S. Cl.
CPC .................................. *G11B 7/1374* (2013.01)
USPC ............................. 359/719; 359/652; 359/654

(58) Field of Classification Search
USPC .......................................... 359/652, 654, 719
See application file for complete search history.

(56) References Cited

U.S. PATENT DOCUMENTS

| 7,408,866 | B2 | 8/2008 | Kimura |
| 7,545,583 | B2 * | 6/2009 | Hayashi et al. ............... 359/708 |
| 2002/0060857 | A1 | 5/2002 | Hosoe |
| 2003/0151830 | A1 | 8/2003 | Hosoe |
| 2003/0169515 | A1 | 9/2003 | Hosoe |
| 2004/0130804 | A1 * | 7/2004 | Mimori ......................... 359/719 |
| 2005/0008889 | A1 | 1/2005 | Hayashi et al. |
| 2005/0254399 | A1 | 11/2005 | Kimura |
| 2006/0120816 | A1 | 6/2006 | Morimoto et al. |
| 2007/0211606 | A1 | 9/2007 | Nakamura et al. |
| 2007/0211607 | A1 | 9/2007 | Nakamura et al. |

(Continued)

FOREIGN PATENT DOCUMENTS

| CN | 1571038 | 1/2005 |
| CN | 1677133 | 10/2005 |

(Continued)

*Primary Examiner* — Jack Dinh
(74) *Attorney, Agent, or Firm* — Cozen O'Connor

(57) ABSTRACT

A method for processing a material for a die for molding an objective lens which is formed with a multilevel structure on the curved surface thereof, wherein the transfer surface of the objective lens is cut by a tool having a cutting face, the outline of which includes a linear first edge portion, a linear second edge portion extending in a direction which intersects the first edge portion at an acute angle thereto, and a third edge portion which joins the ends of the first and second edge portions, while the die material is rotated around the axis thereof, in a state in which at least the first edge portion and the second edge portion of the tool is inclined with respect to the axis and while the tool is moved only in the axial direction and in the direction which intersects the axis.

11 Claims, 10 Drawing Sheets

(56) References Cited

U.S. PATENT DOCUMENTS

| | | |
|---|---|---|
| 2007/0211608 A1 | 9/2007 | Nakamura et al. |
| 2007/0211609 A1 | 9/2007 | Nakamura et al. |
| 2007/0217315 A1 | 9/2007 | Ota et al. |
| 2007/0217316 A1 | 9/2007 | Ota et al. |
| 2010/0054108 A1 | 3/2010 | Kimura |
| 2010/0284262 A1 | 11/2010 | Nakamura et al. |
| 2011/0194396 A1 | 8/2011 | Nakamura et al. |

FOREIGN PATENT DOCUMENTS

| | | |
|---|---|---|
| JP | 2006-231428 | 9/2006 |
| JP | 2007-125649 | 4/2007 |
| JP | 2007-181882 | 7/2007 |
| JP | 2009-050929 | 3/2009 |
| JP | 2009-117030 | 5/2009 |
| JP | 2009-151924 | 7/2009 |
| WO | WO 2007/102318 | 9/2007 |

* cited by examiner

US 8,786,965 B2

DIE PROCESSING METHOD, DIE, OBJECTIVE LENS, AND OPTICAL PICK-UP DEVICE

RELATED APPLICATIONS

This is a U.S. National Phase Application under 35 USC 371 of International Application PCT/JP2010/063860 filed on Aug. 17, 2010.

This patent application claims the priority of Japanese patent application JP2009-227874 filed Sep. 10, 2009, the disclosure contents of which is hereby incorporated by reference.

TECHNICAL FIELD

The present invention relates to a die processing method, a die, an objective lens and an optical pick-up device.

BACKGROUND ART

In recent years, the research and development have been rapidly proceeded for an optical pick-up device, which is capable of recording and/or reproducing information by means of a high-density optical disk (hereinafter, "recording and/or reproducing" will be expressed by using following wording "recording/reproducing") by using a blue-violet semiconductor laser having wavelength of about 400 nm and the optical pick-up device is already on the market. As an example of the high-density optical disk, regarding so-called a "Blu-ray Disc" (hereinafter it will be called BD) which conducts recording/reproducing of information with the specification of NA 0.85 and wavelength of a light source equal to 405 nm, information of 25 GB per a layer can be recorded on the optical disk having a diameter of 12 cm, which is the same size as a DVD (NA 0.6 and wavelength of a light source 650 nm and recording capacity 4.7 GB).

On the other hand, it is sometimes considered that a product, such as an optical disk player/recorder (optical information record reproducing device), which is capable of only recording/reproducing information for the above type of high-density optical disk is not valuable enough. Taking account of a fact that, at present, DVDs and CDs (Compact Disk), onto which various kinds of information have been recorded, are on the market, the value of the product as a high-density optical disk player/recorder is increased by, not only enabling to record/reproduce information for the high-density optical disk, for example, but also enabling to appropriately record/reproduce information additionally for DVDs and CDs, which a user possesses. From these backgrounds, the optical pick-up device installed in the high-density optical disk player/recorder is required to be capable of appropriately recording/reproducing information for anyone of high-density optical disk, a DVD and a CD while keeping compatibility.

It can be considered, as a method by which the information can be adequately recorded/reproduced while the compatibility is maintained also to anyone of the high density optical disk and DVD and further to CD, a method to selectively switch an optical system for the high density optical disk and an optical system for DVD and CD corresponding to the recording density of the optical disk to which the information is recorded/reproduced. However, it requires a plurality of optical systems, which is disadvantageous for the size-reduction and which increases the cost.

Accordingly, in order to simplify the structure of the optical pick-up device and to intend the reduction of cost, it is preferable to make an optical system for the high density optical disk and an optical system for DVD and CD into a common optical system, and to reduce the number of optical parts contributing the optical pick-up device as much as possible, even when the optical pick-up device has compatibility. Then, providing an objective optical element which is arranged to face an optical disk in common as much as possible, is most advantageous for the size-reduction of the construction or cost reduction of the optical pick-up device.

Concerning the above, Patent Document 1 describes an optical pick-up device which, using a common objective lens, focuses light beams having three different wavelengths onto the information recording surfaces of a high density optical disk, DVD, and CD, and carries out recording and/or reproducing of information compatibly with them.

PRIOR ARTS

Patent Document

Patent Document 1: Description of Patent No. JP 4033239

SUMMARY OF THE INVENTION

Problem to be Solved by the Invention

The objective lens described in Patent Document 1 sometimes has an optical path difference providing structure known as a multilevel structure, on an optical surface in order to suitably focus light beams having three different wavelengths onto the information recording surfaces of a high density optical disk, DVD, and CD. However, since the multilevel structure is a fine structure having a narrow width and a deep groove shape, a fine structure responding to the above fine structure has to be formed on the transfer surface of a die on which an objective lens is formed by transfer, and therefore, there may be caused cutting tool interference in a die material even if a sharp point cutting tool having a sharp point is used. Therefore, in order to avoid the cutting tool interference, cutting processing has to be carried out while the sharp point cutting tool is rotating, and thereby an expensive multispindle machine is required, resulting in an increase in cost of the die.

It is an objective of the present invention to provide a die processing method which makes it possible to inexpensively process a die for molding an objective lens having, for example, a multilevel structure for use in an optical pick-up device, and a die processed thereby, and further an objective lens molded by the above die, and an optical pick-up device using the above objective lens.

Measures to Solve the Problems

The die processing method of the embodiment 1 is one for molding an objective lens which has a multilevel structure on a curved surface so as to be commonly used in an optical pick-up device compatible with different optical disks and to focus a light flux onto an information recording surface of each of the optical disks, the method comprising: performing cutting processing on a transfer surface of the die for the objective lens by using a tool, while rotating the die around an axis and while keeping the tool such that at least one of a first edge portion of the tool and a second edge portion of the tool is inclined with respect to the axis, wherein the tool has a cutting face formed of the first edge portion, the second edge portion and a third edge portion which connects an end of the first edge portion and an end of the second edge portion, and wherein the first edge portion is linear, and the second edge portion is linear and extends in a direction intersecting with the first edge portion at an acute angle.

The surface extending in the optical axis direction in the multilevel structure of the objective lens is desirably formed in parallel with the optical axis to increase light use efficiency. However, in order to form, in parallel with the optical axis with high accuracy, all the transfer surfaces of the die which transfers surfaces extending in the optical axis direction in the multilevel structure, the cutting tool interference may be caused in a die material even if a sharp point cutting tool having a sharp point is used, and therefore cutting processing has to be carried out while the sharp point cutting tool is rotated to avoid the cutting tool interference, and thereby an expensive multispindle machine is required, resulting in an increase in cost of the die. On the other hand, according to the present invention, in a state that at least one of the above first edge portion and the above second edge portion of the above tool is inclined with respect to the above axis, by carrying out cutting processing while the tool is moved only in the above axis direction and in the direction crossing with the above axis, the die processing can be carried out using an inexpensive processing machine having a simple configuration such as, for example, a biaxial processing machine, while securing optical performance of an objective lens. In addition, since the die surface for transferring the multilevel structure is inclined with respect to an axis, there is also an advantage of easy mold releasing. Further, even in a processing machine in which a tool can be rotated such as a triple spindle machine, the tool is also liable to interfere with the die at a position where the surface is tightly curved such as the periphery of an objective lens, and therefore there is also an advantage that, interference between the tool and the die can be prevented by the present invention.

The die processing method of the embodiment 2 is one wherein, in the embodiment 1 of the invention, the cutting processing is performed on the transfer surface for the objective lens by moving the tool only in the axis direction and in a direction intersecting with the axis, while at least one of the first edge portion and the second edge portion is inclined with respect to the axis.

The die processing method of the embodiment 3 is one wherein, in the embodiment 2 of the invention, the processing is performed while a slope angle $\theta 1$ between the axis and an edge portion which is closer to the axis, out of the first and the second edge portions is made larger than a slope angle $\theta 2$ between the axis and an edge portion which is farther from the axis, out of the first and the second edge portions.

The die processing method of the embodiment 4 is one wherein, in the embodiment 3 of the invention, wherein following formulae are satisfied:

$$15° \leq \theta 1 \leq 35° \qquad \text{Formula (1)}$$

$$0° \leq \theta 2 \leq 15° \qquad \text{Formula (2)}$$

The die processing method of the embodiment 5 is one wherein, in the embodiment 4 of the invention, a following formula is satisfied:

$$1° \leq \theta 2 \leq 15° \qquad \text{Formula (3)}$$

The die processing method of the embodiment 6 is one wherein, in the embodiment 1 or 2 of the invention, the processing is performed while a slope angle $\theta 1$ between the axis and an edge portion which is closer to the axis, out of the first and the second edge portions is made equal to or nearly equal to a slope angle $\theta 2$ between the axis and an edge portion which is farther from the axis, out of the first and the second edge portions.

The die processing method of the embodiment 7 is one wherein, in the embodiment 6 of the invention, a following formula is satisfied:

$$10° \leq \theta 1 \leq 20° \qquad \text{Formula (4)}$$

The die processing method of the embodiment 8 is one wherein, in any one of the embodiments 1 to 7 of the invention, the processing is performed while the tool is moved so as to approach the axis.

The die processing method of the embodiment 9 is one wherein, in any one of the embodiments 3 to 5 of the invention, the processing is performed while the tool is moved in a direction intersecting with the axis so that the edge portion having the slope angle $\theta 1$ with respect to the axis takes a lead to cut a material of the die.

The die processing method of the embodiment 10 is one wherein, in any one of the embodiment 1 to 9 of the invention, the tool is a sharp point cutting tool.

The die processing method of the embodiment 11 is one wherein, in any one of the embodiments 1 to 10 of the invention, in addition to the multilevel structure, a blaze structure is formed on the curved surface of the objective lens.

The die processing method of the embodiment 12 is one wherein, in any one of the embodiments 1 to 11 of the invention, a following formula is satisfied, when a thickness of the objective lens along the axis and a focal length of the objective lens are set to be d (mm) and f (mm) respectively:

$$0.9 \leq d/f \leq 1.6 \qquad \text{Formula (5)}$$

The die of the embodiment 13 is formed by using the method for processing a die of any one of the embodiments 1-12.

The objective lens of the embodiment 14 is one which has a multilevel structure on a curved surface so as to be commonly used in an optical pick-up device compatible with different optical disks and to focus a light flux onto an information recording surface of each of the optical disks, wherein at least a part of surfaces extending in a direction of an optical axis in the multilevel structure is inclined with respect to the optical axis.

The surface extending in the optical axis direction in the multilevel structure of the objective lens is desirably formed in parallel with respect to the optical axis to increase light use efficiency. However, in order to form, in parallel with respect to the optical axis with high accuracy, all the transfer surfaces of the die which transfers surfaces extending in the optical axis direction in the multilevel structure, the cutting tool interference may be caused in a die material even if a sharp point cutting tool having a sharp point is used, and therefore cutting processing has to be carried out while the sharp point cutting tool is rotated to avoid the cutting tool interference, and thereby an expensive multispindle machine is required, resulting in an increase in cost of the die. Further, since particularly an objective lens for high-density optical disk has the relatively small radius curvature due to a high NA, the problem of cutting tool interference becomes larger. On the other hand, according to the present invention, in a state that an edge portion of a cutting face of a cutting tool for cutting a die is deliberately inclined with respect to the axis, it becomes possible to carry out cutting processing of a die while the cutting tool is moved only in the axis direction and in a direction crossing with the above axis, the die processing can be carried out using an inexpensive processing machine having a simple configuration such as, for example, a biaxial processing machine, and further an objective lens can be inexpensively manufactured using such a die. In addition, since the surface along the optical axis of the multilevel structure is inclined with respect to an axis, there are also advantages of easy mold releasing after the molding and decrease reducing loss of the amount of light due to a manufacturing error. Further, even in a processing machine which can rotate a tool such as a triple spindle machine, the tool is also liable to interfere with the die at a position where the surface is tightly curved such as the periphery of an objective lens, and therefore there is also an advantage that interference between the tool and the die can be prevented by the present invention.

In one basic structure of multilevel structures, a surface which is away from the optical axis out of two surfaces extending in the optical axis direction and facing with each other causes a loss of the amount of light by being inclined with respect to the optical axis, but a surface which is closer to the optical axis does not increase a loss of the amount of light even if the surface is inclined with respect to the optical axis due to a shadow effect by an angle of refraction. Therefore, in one basic structure of multilevel structures, it is preferable that by making a surface, which is closer to the optical axis, out of two surfaces extending in the optical axis direction and facing with each other, inclined with respect to the optical axis, and by making a surface, which is away from the optical axis, parallel to the optical axis as much as possible, effects of the present invention that the lens can be processed with a simple processing machine such as a biaxial processing machine, and the cost can be decreased, as well as the lens being easily taken out from the die, can be obtained.

The objective lens of the embodiment 15 is one wherein, in the embodiment 14 of the invention, on a cross section of the objective lens in the optical axis direction, a slope angle $\theta 1'$ between the optical axis and a surface which is closer to the optical axis, out of two surfaces extending in the optical axis direction and facing each other, is larger than a slope angle $\theta 2'$ between the optical axis and a surface which is farther from the optical axis, out of the two surfaces, in one step unit of the multilevel structure.

The objective lens of the embodiment 16 is one wherein, in the embodiment 15 of the invention, following formulae are satisfied:

$$15° \leq \theta 1' \leq 35°$$ Formula (6)

$$0° \leq \theta 2' \leq 15°$$ Formula (7)

The objective lens of the embodiment 17 is one wherein, in the embodiment 16 of the invention, a following formula is satisfied:

$$1° \leq \theta 2' \leq 15°$$ Formula (8)

The objective lens of the embodiment 18 is one wherein, in the embodiment 14 of the invention, on a cross section of the objective lens in the optical axis direction, a slope angle $\theta 1'$ between the optical axis and a surface which is closer to the optical axis, out of two surfaces extending in the optical axis direction and facing each other is equal to or nearly equal to a slope angle $\theta 2'$ between the optical axis and a surface which is farther from the optical axis, out of the two surfaces, in one step unit of the multilevel structure.

The objective lens of the embodiment 19 is one wherein, in the embodiment 18 of the invention, a following formula is satisfied:

$$10° \leq \theta 1' \leq 20°$$ Formula (9)

The objective lens of the embodiment 20 is one wherein, in any one of the embodiments 14 to 19 of the invention, in addition to the multilevel structure, a blaze structure is formed on the curved surface of the objective lens.

The objective lens of the embodiment 21 is one wherein, in any one of the embodiments 14 to 20 of the invention, a following formula is satisfied, when a thickness of the objective lens along the axis and a focal length of the objective lens are set to be d (mm) and f (mm) respectively:

$$0.9 \leq d/f \leq 1.6$$ Formula (5)

The optical pick-up device of the embodiment 22 is one wherein the objective lens described in any one of the embodiments 14 to 21 has been used.

The tool includes a cutting tool. FIGS. 1a and 1b are schematic illustrations showing examples of a shape of cutting face of the cutting tool. The end of the cutting face SP of the cutting tool shown in FIG. 1a is profiled by linear first edge portion E1, linear second edge portion E2 which extends in the crossing direction at an acute angle with respect to first edge portion E1, and arc-like third edge portion E3 which connects the end portion of first edge portion E1 and the end portion of second edge portion E2. In particular, a cutting tool having radius of third edge portion E3 of 0.5 μm to 5.0 μm is referred to as a sharp point cutting tool, and a cutting tool having radius "r" thereof of 5.0 μm or more is referred to as an R cutting tool. The end of the cutting face SP of the cutting tool shown in FIG. 1b is profiled by linear first edge portion E1, linear second edge portion E2 which extends in parallel therewith, and third edge portion E3 perpendicular to first edge portion E1 and second edge portion E2. Such cutting tool is referred to as a flat-point tool, and is distinguished from the sharp point cutting tool or the R cutting tool. In particular, by using the sharp point cutting tool, the radius of an inner corner of a fine groove shape which transfers a multilevel structure is allowed to be small, and thereby use efficiency of light through an objective lens, which was formed using such a die, can be further increased. However, R cutting tool may be used depending on uses.

If cutting processing is carried out while moving a cutting tool so as to approach an axis of a die material, there are also advantages that a burden on the cutting tool can be decreased, and steps of the center part of the material becomes small at the time of completion of the cutting processing as well as extending the tool life.

It is preferable that, if cutting processing is carried out while moving a cutting tool in the direction crossing an axis so that an edge portion having slope angle $\theta 1$ with respect to an axis cuts a die material ahead of other parts thereof, a burden on the cutting tool can be decreased and a tool life can be extended.

An optical pick-up device relating to the present invention is composed of at least three light sources: a first light source, a second light source, and a third light source. Further, the optical pick-up device has a light-converging optical system for converging a first light flux onto an information recording surface of a first optical disk, converging a second light flux onto an information recording surface of a second optical disk, and converging a third light flux onto an information recording surface of a third optical disk. The optical pick-up device further has a light-receiving element for receiving a reflection light flux from the information recording surface of each of the first optical disk, second optical disk, and third optical disk.

The first optical disk has a protective substrate with a thickness of t1 and an information recording surface. The second optical disk has a protective substrate with a thickness of t2 (t1<t2) and an information recording surface. The third optical disk has a protective substrate with a thickness of t3 (t2<t3) and an information recording surface. It is preferable that the first optical disk represents a BD, the second optical disk represents a DVD, and the third optical disk represents a CD, but optical disks are not limited to those. Each of the first optical disk, the second optical disk, and the third optical disk may be a multilayer optical disk with a plurality of information recording surfaces.

In the present specification, BD represents a generic name of optical disks belonging to BD group having a protective substrate with a thickness in the range of about 0.05 to 0.125 mm, for which information is recorded/reproduced with a light flux with a wavelength of about 390 to 415 nm by an objective lens with NA of about 0.8 to 0.9. BDs include such a disk including only a single information recording layer and such a disk including two information recording layers. Further, DVD in the present specification represents a generic name of optical disks belonging to DVD group with a protective substrate of about 0.6 mm for which information is recorded/reproduced by an objective lens with NA in the range of about 0.60 to 0.67. DVDs include DVD-ROM, DVD-Video, DVD Audio, DVD-RAM, DVD-R, DVD-RW, DVD+R and DVD+RW. In the present specification, CD represents a generic name of optical disks belonging to CD group having a protective substrate of about 1.2 mm, for which information is recorded/reproduced by an objective lens with NA in the range of about 0.45 to 0.51. CDs include CD-ROM, CD-Audio, CD-Video, CD-R and CD-RW. Among these optical disks, a high density optical disk provides the highest recording density. Regarding the recording density, BD has the highest and DVD and CD have the second and third highest recording density, respectively.

Thicknesses t1, t2, and t3 of the protective substrates preferably satisfy the following conditional expressions, but the thicknesses are not limited to those. Herein, a thickness of a protective substrate means a thickness of a protective substrate formed on a surface of an optical disk. Namely, it means a thickness of a protective substrate measured from a surface of an optical disk to an information recording surface placed at the closest position to the surface of the optical disk $$0.050 \text{ mm} \leq t1 \leq 50.125 \text{ mm}$$

$$0.5 \text{ mm} \leq t2 \leq 0.7 \text{ mm}$$

$$1.0 \text{ mm} \leq t3 \leq 1.3 \text{ mm}$$

In the present specification, each of the first light source, the second light source, and the third light source is preferably a laser light source. A semiconductor laser, and a silicon laser are preferably used for the laser light source. The first wavelength $\lambda 1$ of the first flux emitted from the first light source is shorter than second wavelength $\lambda 2$ of the second flux emitted from the second light source and the second wavelength $\lambda 2$ is shorter than third wavelength $\lambda 3$ of the third flux emitted from the third light source.

When a BD, DVD and CD are employed as the first optical disk, the second optical disk and the third optical disk respectively, the wavelength $\lambda 1$ of the first light source is preferably from 350 nm or more, and 440 nm or less, and further preferably from 390 nm or more, and 415 nm or less, the second wavelength $\lambda 2$ of the second light source is preferably from 570 nm or more, and 680 nm or less, and is further preferably from 630 nm or more, and 670 nm or less, and the third wavelength $\lambda 3$ of the third light source is preferably from 750 nm or more, and 880 nm or less, and is further preferably from 760 nm or more, and 820 nm or less.

Further, at least two light sources of the first light source, the second light source, and the third light source may also be unitized. The unitization means fixed storage, for example, the first light source and the second light source into one package. Additionally to the light sources, a light-receiving element described below can be unitized.

As a light-receiving element, a photodetector such as a photodiode is preferably used. Light reflected on an information recording surface of an optical disk enters the light-receiving element, and signal outputted from the light-receiving element is used for obtaining the read signal of the information recorded in each optical disk. Further, change in the light amount on the light-receiving element caused because of the change in the spot shape and the change in the spot position, is detected to conduct the focus detection and the tracking detection. The objective lens can be moved based on these detections for focusing and tracking of the objective lens. The light-receiving element may be composed of a plurality of photodetectors. The light-receiving element may also have a main photodetector and secondary photodetector. For example, the light-receiving element can be provided with a main photodetector which receives a main light used for recording and reproducing information, and with two secondary photodetectors positioned on both sides of the main photodetector so as to receive secondary light for tracking adjustment by the two secondary photodetectors. Alternatively, the light receiving-element may be provided with a plurality of light-receiving elements corresponding to respective light sources.

The light-converging optical system includes an objective lens. The light-converging optical system preferably includes a coupling lens such as a collimation lens other than the objective lens. The coupling lens is a single lens or a group of lenses which is arranged between an objective lens and a light source and changes divergent angle of a light flux. The collimation lens is one type of coupling lenses, and is a lens converting an incident light flux into a parallel light flux. In the present specification, an objective lens is an optical system which is arranged to face an optical disk in the optical pick-up device, and has a function which converges a light flux emitted from the light source onto an information recording surface of an optical disk. Preferably, the objective lens is formed of a single lens. The objective lens may also be a glass lens, a plastic lens or a hybrid lens in which an optical path difference providing structure is formed on the glass lens by using a resin such as photo-curable resin, UV-curable resin, and thermosetting resin. The objective lens preferably has a refractive surface which is an aspheric surface. Further, in the objective lens, a base surface where the optical path difference providing structure is provided, is preferably an aspheric surface.

When the objective lens is a glass lens, a glass material used for the glass lens preferably has a glass transition point Tg of 450° C. or less, or preferably of 400° C. or less. By using the glass material whose glass transition point Tg is 450° C. or less, the material can be molded at a comparatively low temperature. Therefore, the life of molds can be prolonged. As an example of the glass material whose glass transition point Tg is low, there are K-PG325 and K-PG375 (both are trade names) made by SUMITA Optical glass, Inc.

A glass lens has generally larger specific gravity than a resin lens. Therefore, an objective lens made of a glass lens has larger weight and apply a larger burden to an actuator which drives the objective lens. Therefore, when a glass lens is employed for the objective lens, a glass material having smaller specific gravity is preferably used for the objective lens. Specifically, the specific gravity is preferably 4.0 or less, and is further preferably 3.0 or less.

When the objective lens is a plastic lens, it is preferable that acyclic hydrocarbon polymer such as cyclic olefin resin is employed for the objective lens. Among the materials, a preferable resin has: refractive index within the range of 1.54 to 1.60 at the temperature 25° C. and wavelength 405 nm, and ratio of refractive index change dN/dT (° C.$^{-1}$) which is within the range of $-20\times10^{-5}$ to $-5\times10^{-5}$ (further preferably, $-10\times10^{-5}$ to $-8\times10^{-5}$), wherein the ratio of refractive index change is caused due to the temperature change within the temperature range of $-5°$ C. to 70° C. at the wavelength 405 nm. Further, when a plastic lens is employed for the objective lens, it is preferable that a plastic lens is also employed for the coupling lens.

Further, it is preferable that a material which forms the objective lens, has the Abbe number of 50 or more.

An objective lens of the present embodiment will be further described below. The objective lens preferably includes at least a central area, an intermediate area surrounding the central area, and a peripheral area surrounding the intermediate area, on at least one optical surface. It is preferable that the central area includes the optical axis of the objective lens. However, a small area including the optical axis may be provided as an unused area or an area for a special purpose, and the central area may be provided to surround the small area. The central area, intermediate area, and peripheral area are preferably formed on one optical surface. As shown in FIG. 2, it is preferable that the central area CN, intermediate area MD, peripheral area OT are provided on the same optical surface concentrically around the optical axis. Further, it is preferable that a first optical path difference providing structure is provided in the central area of the objective lens and a second optical path difference providing structure is provided in the intermediate area. The peripheral area may be a refractive surface, or a third optical path difference providing structure may be provided in the peripheral area. It is preferable that each of the central area, intermediate area, and peripheral area adjoins each other, however, there may be slight gaps between the areas.

The central area of the objective lens is preferably a common area of the first, second and third optical disks to be used for recording/reproducing information for the first optical disk, the second optical disk, and the third optical disk. In other words, it is preferable that the objective lens converges a first light flux that passes through the central area on an information recording surface of the first optical disk so that recording/reproducing of information may be conducted, converges a second light flux that passes through the central area on an information recording surface of the second optical disk so that recording and/or reproducing of information may be conducted, and converges a third light flux that passes through the central area on an information recording surface of the third optical disk so that recording/reproducing of information may be conducted. Further, it is preferable that a first optical path difference providing structure arranged in the central area corrects spherical aberration caused by a difference between thickness t1 of a protective substrate of the first optical disk and thickness t2 of a protective substrate of the second optical disk/spherical aberration caused by a difference in wavelength between the first light flux and the second light flux, for the first light flux and the second light flux both passing through the first optical path difference providing structure. Further, it is preferable that the first optical path difference providing structure corrects spherical aberration caused by a difference between thickness t1 of a protective substrate of the first optical disk and thickness t3 of a protective substrate of the third optical disk/spherical aberration caused by a wavelength difference between the first light flux and the third light flux, for the first light flux and the third light flux both passing through the first optical path difference providing structure.

An intermediate area of the objective lens is preferably a common area of the first and second optical disks which are used for recording/reproducing for the first optical disk and the second optical disk, but are not used for recording/reproducing for the third optical disk. That is, it is preferable that the objective lens converges the first light flux that passes through the intermediate area on an information recording surface of the first optical disk so that recording/reproducing of information may be conducted, and converges the second light flux that passes through the intermediate area on an information recording surface of the second optical disk so that recording/reproducing of information may be conducted. On the other hand, preferably the objective lens does not converge the third light flux that passes through the intermediate area on an information recording surface of the third optical disk so that recording and/or reproducing of information may be conducted. It is preferable that the third light flux that passes through the intermediate area of the objective lens forms flare light on an information recording surface of the third optical disk. As shown in FIG. 3, when a spot is formed by the third light flux that has passed through the objective lens on an information recording surface of the third optical disk, it is preferable that the spot preferably includes a central spot portion SCN whose light density is high, an intermediate spot portion SMD whose light density is lower than that in the central spot portion, and a peripheral spot portion SOT whose light density is higher than that in the intermediate spot portion and is lower than that in the central spot portion in the order from light axis (or central spot portion) toward outside. The central spot portion is preferably used for recording/reproducing of information of an optical disk, while, the intermediate spot portion and the peripheral spot portion are not used for recording/reproducing of information of the optical disk. In the foregoing, the peripheral spot portion is called a flare. However, also in the case that the spot includes just the central spot portion and the peripheral spot portion but does not include the intermediate spot portion around the central spot portion, namely, in the case that a spot which is large in size and has weak light intensity is formed around a converged spot, the peripheral spot portion can be called a flare. In other words, it can be said that it is preferable that the third light flux passing through the intermediate spot area of the objective lens forms a peripheral spot portion on an information recording surface of the third optical disk.

A peripheral area of the objective lens is preferably an exclusive area for the first optical disk that is used for recording/reproducing for the first optical disk but is not used for recording/reproducing for the second optical disk or the third optical disk. That is, the objective lens preferably converges a first light flux that passes through the peripheral area on an information recording surface of the first optical disk so that recording and/or reproducing of information may be conducted. On the other hand, it is preferable that the objective lens does not converge the second light flux that passes through the peripheral area on an information recording surface of the second optical disk so that recording/reproducing of information may be conducted, and it does not converge the third light flux that passes through the peripheral area on an information recording surface of the third optical disk so that recording/reproducing of information may be conducted. It is preferable that the second light flux and the third light flux which pass through the peripheral area of the objective lens form flare light on information recording surfaces of the second and third optical disks. In other words, it is preferable that the second light flux and the third light flux which have passed the peripheral area of the objective lens form the peripheral spot portion on the information recording surface of the second and third optical disks.

It is preferable that first optical path difference providing structures are provided on the area that is 70% or more of the central area of the objective lens, and it is further preferable that the area for the first optical path difference providing structures is 90% or more. What is further preferable is that the first optical path difference providing structures are provided on the whole surface of the central area. It is preferable that second optical path difference providing structures are provided on the area that is 70% or more of the intermediate area of the objective lens, and it is further preferable that the area for the second optical path difference providing structures is 90% or more. What is further preferable is that the second optical path difference providing structures are provided on the whole surface of the intermediate area. When the peripheral area has thereon the third optical path difference providing structure, it is preferable that third optical path difference providing structures are provided on the area that is 70% or more of the peripheral area of the objective lens, and it is further preferable that the area for the third optical path difference providing structures is 90% or more. What is further preferable is that the third optical path difference providing structures are provided on the whole surface of the peripheral area.

Incidentally, the optical path difference providing structure mentioned in the present specification is a general term for the structure that provides an optical path difference to an incident light flux. The optical path difference providing structure also includes a phase difference providing structure that provides a phase difference. Further, the phase difference providing structure includes a diffraction structure. It is preferable that the optical path difference providing structure of the present embodiment is a diffraction structure. The optical path difference providing structure includes a step, and it preferably includes a plurality of steps. Due to the step or steps, an optical path difference and/or a phase difference is provided to an incident light flux. An optical path difference to be provided by the optical path difference providing structure may either be a multiple of an integer of a wavelength of an incident light flux in terms of a length or not be a multiple of an integer of a wavelength of an incident light flux. The steps may either be arranged with intervals periodically in the direction perpendicular to the optical axis, or be arranged with interval non-periodically in the direction perpendicular to the optical axis. When the objective lens equipped with an optical path difference providing structure is an aspheric single lens, an incident angle of a light flux for the objective lens varies depending on a height from the optical axis, thus, an amount of step of the optical path difference providing structure is slightly different from others for each ring-shaped zone. For example, when the objective lens is a convex single lens with an aspheric surface, it is a general trend that an amount of step of the optical path difference providing structure grows greater as a position in the optical path difference providing structure becomes more distant from the optical axis, even in the case of the optical path difference providing structure that provides the constant optical path difference.

Further, a diffraction structure mentioned in the present specification is a general term for a structure that has a step or steps, for providing a function to converge or to diverge a light flux by a diffraction effect. For example, a diffraction structure can be formed by a plurality of unit forms which are arranged around the optical axis, such that, when a light flux enters the respective unit forms, a wavefront of the transmitted light flux is shifted at every adjoining ring-shaped zone to form a new wavefront by which light is converged or diverged. The diffraction structure preferably includes a plurality of steps, and the steps may either be arranged with intervals periodically in the direction perpendicular to the optical axis, or be arranged with intervals non-periodically in the direction perpendicular to the optical axis. When an objective lens with a diffraction structure is provided as an aspheric single lens, an angle of a light flux entering the objective lens varies depending on a height from the optical axis. Thereby, an amount of step of the diffraction structure slightly varies on each ring-shaped zone. For example, when the objective lens is a convex single lens including an aspheric surface, it is a general trend that an amount of step grows greater as a position of the step is more distant from the optical axis, even in a diffraction structure which generates a diffracted light fluxes with the same diffraction order.

Incidentally, it is preferable that an optical path difference providing structure has a plurality of ring-shaped zones which are formed in concentric circles whose centers are on the optical axis. Further, the optical path difference providing structure can take generally various sectional forms (sectional forms on the surface including the optical axis) which are classified roughly into a blaze structure and a multilevel structure (a staircase structure) in terms of a sectional form including the optical axis.

The blaze structure has a form whose sectional form including the optical axis of an objective lens having an optical path difference providing structure are in a serrated form, as shown in FIGS. 4a and 4b. In the example shown in FIGS. 4a-4e, it is assumed that the upper side of the sheet is the light source side, and the lower side of the sheet is the optical disk side, and that, for easy understanding, the optical path difference providing structure is formed on a plane representing a base aspheric surface. However in the invention, it is assumed that it is provided on a curved optical surface of an objective lens. In the blaze-type structure, a length of one blaze unit in the direction perpendicular to the optical axis is called pitch P (see FIGS. 4a and 4b). Further, a length of a step in the direction that is along the optical axis of blaze is called step amount B (see FIG. 4a).

The multilevel structure has a form whose sectional form including the optical axis of an objective lens having an optical path difference providing structure has a plurality of small-staircase units (each being called a stair case unit), as shown in FIGS. 4c and 4d. Incidentally, "V-level" mentioned in the present specification means a form such that one staircase unit of the multilevel structure has ring-shaped surfaces (which is sometimes called terrace surfaces) in a perpendicular direction to the optical axis (that extend in the perpendicular direction to the optical axis), where the ring-shaped surfaces are formed by being sectioned by the steps and are separated into ring-shaped surfaces whose number is V. Especially, a multilevel structure of three levels or more includes small steps and large steps.

For example, an optical path difference providing structure shown in FIG. 4c is called a 5-level multilevel structure and an optical path difference providing structure shown in FIG. 4d is called a 2-level multilevel structure (which is called also binary structure). A 2-level multilevel structure will be explained as follows. The 2-level multilevel structure includes ring-shaped zones in concentric ringed shape around the optical axis. The cross sectional form including the optical axis of the plural ring-shaped zones is provided with a plurality of side surfaces Pa and Pb extending in the direction of the optical axis, light-source-side terrace surfaces Pc each connecting light-source-side ends of the neighboring side surfaces Pa and Pb, and optical-disk-side terrace surfaces Pd each connecting optical-disk-side ends of the neighboring side surfaces Pa and Pb. The light-source-side terrace surfaces Pc and the optical-disk-side terrace surfaces Pd are arranged alternately in a direction crossing the optical axis. At least one of side surfaces Pa and Pb along the light axis can be inclined with respect to the light axis as a whole but a part of the step surfaces Pa (or Pb) can be inclined with respect to the light axis as shown in FIG. 4e (similarly in the multilevel structure in FIG. 4c).

Further, in the multilevel structure, a length of one staircase unit in the direction perpendicular to the optical axis is called pitch P (see FIGS. 4c and 4d). Further, a length of a step in the direction that is in parallel with the optical axis is called step amount B1 and step amount B2. In the case of the multilevel structure of three levels or more, large step amount B1 and small step amount B2 are in existent (see FIG. 4c). The small step amount B2 is preferably less than 10 μm and the width of the step W is less than 6 μm.

Incidentally, it is preferable that an optical path difference providing structure is a structure where a certain unit form is repeated periodically. The expression saying "a certain unit form is repeated periodically" in this case naturally includes a form wherein the same form is repeated at the same period. Further, the expression saying "a certain unit form is repeated periodically" in this case also includes a form wherein the cycle of unit form as one unit of the cycle becomes gradually longer or becomes gradually shorter with regularity.

When an optical path difference providing structure has a blaze-type structure, it has a form where serrated forms each representing a unit form are repeated. The optical path difference providing structure may have a form that the same serrated forms are repeated as shown in FIG. 4a, or has a shape where the pitch of a serrated form becomes gradually longer or shorter as the position advances to be farther from the optical axis, as shown in FIG. 4b. In addition, The optical path difference providing structure may have a form where steps of the blaze-type structure faces opposite to the optical axis (center) in a certain area, and steps of the blaze-type structure faces the optical axis (center) in the other area, and where a transition area is provided for switching the direction of the steps of the blaze-type structure. Incidentally, when employing a structure to switch the direction of the steps of the blaze-type structure on the midway as stated above, it becomes possible to enlarge a pitch of the ring-shaped zones and to suppress a decline of transmittance that is caused by manufacturing errors for the optical path difference providing structure.

When an optical path difference providing structure has a multilevel structure, the structure can have a form in which 5-level staircase units as shown in FIG. 4c are repeated. Further, the structure may have a form in which a pitch of a staircase unit becomes gradually longer or shorter as the position advances to be farther from the optical axis.

For example, a first optical path difference providing structure arranged at the central area is preferably in a mode having only a single basic structure. The single basic structure is a multilevel structure. Further preferable conditions of this mode will be detailed below.

The basic structure, which is a multilevel structure, makes the amount of light diffraction in the X-th order of a first light flux having passed through the basic structure larger than the amount of light diffraction in any other order, the amount of light diffraction in the Y-th order of a second light flux having passed through the basic structure larger than the amount of light diffraction in any other order, and the amount of light diffraction in the Z-th order of a third light flux having passed through the basic structure larger than the amount of light diffraction in any other order. In this case, any one of X, Y, and Z is preferably not zero. Further, it is preferable that any one of X, Y, and Z is a positive diffraction order, and the remainder are negative diffraction orders.

An example of preferable combination of (X, Y, Z) includes (1, −1, −2), (1, −2, −3), or (1, −3, −4). Particularly preferable is (1, −1, −2) or (1, −2, −3).

Arrangement of such the multilevel structure not only enables compatibility of, for example, three kinds of optical disks, BD/DVD/CD, but makes it possible to provide an objective lens which can maintain a high light-use efficiency for, in particular, BD. For example, it becomes possible to provide an objective lens in which diffraction efficiency for wavelength λ1 is more than or equal to 80%. Further, it also becomes possible to provide an objective lens in which diffraction efficiency for wavelength λ1 is more than or equal to 90%.

From view points of a shape of the optical path difference providing structure and the amount of a step thereof each of cases of X, Y, and Z being 1, −1, and −2 respectively, and of X, Y, and Z being 1, −2, and −3 respectively, can be expressed in the following way.

In the case where X, Y, and Z are 1, −1, and −2 respectively, as it is shown in FIG. 4c, it is preferably a multilevel structure with five levels. Further, it is preferable that the amount of step B2 in the optical axis direction of a small step of the multilevel structure is the amount of a step providing an optical path difference of 1.23 λ1 for first wavelength λ1.

Therefore, the amount of step B2 of a small step of the multilevel structure of this case preferably satisfies the following conditional expression:

$$0.6 \cdot (1.23 \cdot \lambda 1/(n-1)) < B2 < 1.5 \cdot (1.23 \cdot \lambda 1/(n-1)) \quad \text{Formula (10)}$$

In the case where X, Y, and Z are 1, −2, and −3 respectively, it is preferably a multilevel structure with seven levels. Further, it is preferable that the amount of step B2 in the optical axis direction of a small step of the multilevel structure is the amount of a step providing an optical path difference of 1.16λ1 for first wavelength λ1.

Therefore, the amount of step B2 of a small step of the multilevel structure of this case preferably satisfies the following conditional expression:

$$0.6 \cdot (1.16 \cdot \lambda 1/(n-1)) < B2 < 1.5 \cdot (1.16 \cdot \lambda 1/(n-1)) \quad \text{Formula (11)}$$

Next, a second optical path difference providing structure arranged at, for example, the intermediate area will be detailed. The second optical path difference providing structure in this mode is a structure having at least a basic structure.

This basic structure is a multilevel structure, and makes the amount of light diffraction in the N-th order of a first light flux having passed through the basic structure larger than the amount of light diffraction in any other order, the amount of light diffraction in the O-th order of a second light flux having passed through the basic structure larger than the amount of light diffraction in any other order, and the amount of light diffraction in the P-th order of a third light flux having passed through the basic structure larger than the amount of light diffraction in any other order. At this time, it is preferable that (N. P, O)=(0, −1, −1).

At this time, it is preferable that the basic structure is a multilevel structure with three levels, and the amount of a step in the optical axis direction of a small step of the multilevel structure is the amount of a step providing an optical path difference of 1.02λ1 for the first wavelength λ1.

Next, a third optical path difference providing structure arranged at, for example, the peripheral area will be described. The third optical path difference providing structure is, in the case where an objective lens is composed of plastic, preferably arranged to decrease a change of spherical aberration due to a temperature change. The third optical path difference providing structure is preferably composed of single basic structure which is a blaze structure, regardless of modes of the above first and second optical path difference providing structures.

This basic structure is a blaze structure, and makes the amount of light diffraction in the Q-th order of a first light flux having passed through the basic structure larger than the amount of light diffraction in any other order, the amount of light diffraction in the R-th order of a second light flux having passed through the basic structure larger than the amount of light diffraction in any other order, and the amount of light diffraction in the S-th order of a third light flux having passed through the basic structure larger than the amount of light diffraction in any other order. At this time, Q is allowed to be any value, but from a view point to suppress variation of diffraction efficiency when wavelength being varied, (Q, R, S) is preferably any one of (1, 1, 1), (2, 1, 1), (3, 2, 2), and (5, 3, 2).

The above description is for a preferable example of the first optical path difference providing structure, the second optical path difference providing structure, and the third optical path difference providing structure.

As it is shown in the first optical path difference providing structure, the second optical path difference providing structure, and the third optical path difference providing structure, in the case where both the blaze structure and the multilevel structure are formed on one optical surface of an objective lens, it is preferable because the effect of the present invention becomes remarkable. The meaning of the phrase "having both the blaze structure and the multilevel structure" includes both the case of a structure where the blaze structure and the multilevel structure are superimposed over each other at the same position, and the case where the blaze structure and the multilevel structure are placed on different positions of the same optical surface and are not superimposed over each other. In the case where a certain optical surface has only a multilevel structure and has no blaze structure, cutting may be carried out even with a flat point tool, and therefore machining with a biaxial processing machine having the flat point tool may be selected. However, in the case where a certain optical surface has both a multilevel structure and a blaze structure, the flat point tool cannot be used, and then the cutting tool is limited to a sharp point cutting tool or an R cutting tool. Therefore, in order to make the processing with a biaxial processing machine possible, it becomes very important to incline the side surface.

FIG. 5 is a sectional view showing die M which was subjected to cutting processing with sharp point cutting tool SB, and objective lens OBJ which was formed by carrying out injection molding of resin into die M or the like. The rotation axis of a material of die M and the optical axis of objective lens OBJ are designated as RX and OX respectively. The material of die M, which is rotated around rotation axis RX, is subjected to cutting processing in a concave of curved aspheric surface CV to form a groove shape corresponding to the multilevel structure shown in FIG. 4c by relatively moving the sharp point cutting tool SB in the Z axis direction (parallel to rotation axis RX) and in the X axis direction (perpendicular to rotation axis RX) without rotating sharp point cutting tool SB in the figure. It is preferable that, when an angle between first edge portion E1 of sharp point cutting tool SB which is closer to rotation axis RX and the rotation axis RX is designated as θ1, and an angle between second edge portion E2 of sharp point cutting tool SB which is farther from rotation axis RX and the rotation axis RX is designated as θ2, the processing is carried out while maintaining the following relation:

$$15° \leq \theta1 \leq 35° \qquad \text{Formula (1)}$$

$$0° \leq \theta2 \leq 15° \qquad \text{Formula (2)}$$

With this, the groove shape of die M is processed as it is shown in FIG. 5, and, in one groove shape, a surface which extends along notation axis RX and is closer to rotation axis RX is designated as outer surface SP1, and a surface which extends along rotation axis RX and is farther from rotation axis RX is designated as inner surface SP2. It is preferable that, in this case, when an angle between outer surface SP1 and rotation axis RX is designated as θ1, and an angle between inner surface SP2 and rotation axis RX is designated as θ2, the following relation is satisfied:

$$15° \leq \theta1 \leq 35° \qquad \text{Formula (1)}$$

$$0° \leq \theta2 \leq 15° \qquad \text{Formula (2)}$$

With the above die M, objective lens OBJ which is shown in FIG. 5 is transferred and formed together with a ring-shaped zone structure corresponding to the groove shape. In one step unit of the optical path difference providing structure, of two surfaces facing each other, a side surface extending in the optical axis OX direction and is closer to optical axis OX is designated as Pa, and a side surface extending in the optical axis OX direction and is farther from optical axis OX is designated as Pb. It is preferable that, in this case, when an angle between side surface Pa of the ring-shaped zone structure and optical axis OX is designated as θ1', and an angle between side surface Pb and optical axis OX is designated as θ2', the following relation is satisfied:

$$15° \leq \theta1' \leq 35° \qquad \text{Formula (6)}$$

$$0° \leq \theta2' \leq 15° \qquad \text{Formula (7)}$$

When, as it is shown in FIG. 6, substantially parallel light is allowed to enter into such objective lens OBJ, since light flux having entered into objective lens OBJ from a region near a point of intersection of side surface Pa and terrace surface Pc, out of light flux having entered into terrace surface Pc crossing the side surface Pa, goes out from the side surface Pa, the light flux is not effectively used as a light flux being collected on the information recording surface of an optical disk. Further, light flux having entered into objective lens OBJ from side surface Pb are also difficult to be effectively used as light flux being collected on information recording surface of an optical disk. This is referred to as a "shadow effect." Since the shadow effect at side surface Pa exists, even if side surface Pa is parallel to the optical axis, a problem of a loss of the amount of light due to inclination of side surface Pa with respect to an optical axis does not change so much. On the other hand, since there is very few shadow effect at side surface Pb when side surface Pb is parallel to an optical axis, it is preferable for the purpose of reducing the loss of the amount of light that side surface Pb is not inclined with respect to an optical axis, or the inclination is minimized even if it is inclined. Therefore, θ2'≤θ1' is preferable, and satisfaction of Formulae (6) and (7) is further preferable. Satisfaction of Formulae (6) and (7) leads to satisfaction of Formulae (1) and (2). For the purpose of reducing the loss of the amount of light as much as possible, θ2' is preferably 0° or more and 5° or less. To reduce the loss of the amount of light without limit, θ2' is preferably 0°, and, while reducing the loss of the amount of light as much as possible, to make it easier to pull out the objective lens from a die, θ2' is preferably larger than 0° and 5° or less (further preferably 3° or less).

However, considering releasing property of die M, the following formula is preferably satisfied:

Satisfaction of Formula (8) leads to satisfaction of Formula (3).

$$1° \leq \theta2' \leq 15°$$ Formula (8)

The above point is further described in detail. First, description is made with respect to θ1'. As it is shown in FIG. 16, in the case of θ1' being 0°, namely, even in the case where the side surface which is closer to the optical axis is parallel to the optical axis, the light flux in the gray region in FIG. 16, are unable to be used due to the shadow effect, and thereby it is unavoidable to become the loss of the amount of light. Next, as it is shown in FIG. 17, also in the case where the slope θ1' of the side surface closer to the optical axis becomes 35° with respect to the optical axis, the light beams in the gray region are unable to be used due to the shadow effect, but, since the shadow effect exists even in the case where the side surface is parallel to the optical axis as it is shown in FIG. 16, the loss of the amount of light is not particularly increased. Therefore, it is understood that, even if the side surface closer to the optical axis is inclined with respect to the optical axis, there is no increase in adverse effects in the loss of the amount of light. Further, even in the case shown in FIG. 18, where θ1' is an angle between 0° and 35°, the light beams in the gray region are similarly unable to be used due to the shadow effect, but the loss of the amount of light is not particularly increased. Therefore, since the loss of the amount of light is substantially constant when θ1' is between 0° and 35° and the loss increases when it becomes over 35°, 0°≤θ1'≤35° is desirable in view of light use efficiency. Further, considering the edge portion of a sharp point cutting tool or an R cutting tool, or slope angle of the cutting tool and the like, the desirable extent of θ1' becomes 15°≤θ1'≤35°.

Next, description is made with respect to θ2'. As it is shown in FIG. 19, in the case of θ2' being 0°, namely, in the case where the side surface which is farther from the optical axis is parallel to the optical axis, no shadow effect exists, and thereby there is no loss of the amount of light. However, as it is shown in FIG. 20, in the case where the side surface which is farther from the optical axis is inclined with respect to the optical axis, the light flux in the gray region become unable to be used due to the shadow effect. In other words, it is understood that there is increase in adverse effects in the loss of the amount of light by inclining the side surface which is farther from the optical axis with respect to the optical axis. Therefore, it is preferable that the side surface which is farther from the optical axis should be parallel to the optical axis as much as possible.

In the case where there is no need to be overly concerned about the loss of the amount of light, or depending on the shape of the multilevel structure or the like, θ2' may be equal to or nearly equal to θ1'. The phrase "nearly equal to" indicates that the difference between θ2' and θ1' is 5° or less. In this case, the formula below is preferably satisfied. If Formula (9) is satisfied, Formula (4) becomes satisfied.

$$10° \leq \theta1' \leq 20°$$ Formula (9)

The general method for forming an objective lens having an optical path difference providing structure is that a die shape corresponding to a lens shape having the aforesaid optical path difference providing structure is cut out using a biaxial processing machine (an example is shown in FIG. 8) and the like, having a cutting tool such as a sharp point cutting tool (an example is shown in FIGS. 7a and 7b), a melted material is put into the cut out die, and is then cooled, and, after the material is solidified, a lens is taken out from the aforesaid die.

Since the tip of the sharp point cutting tool has no perfect acute angle but a certain curvature, the corner part of the optical path difference providing structure has preferably a curvature.

The objective lens preferably satisfies the following conditional expression (5).

$$0.9 \leq d/f \leq 1.6 \qquad (5)$$

In the expression above, "d" represents a thickness (mm) of the objective lens on the optical axis, and "f" represents a focal length of the objective lens in the first light flux. Preferably "f" represents a focal length at the shortest wavelength among the wavelengths to be used.

When coping with an optical disk used with a short wavelength and high NA like a BD, there are caused problems that astigmatism tends to be caused and decentration coma tends to be caused. However, when the expression (5) is satisfied, it is possible to suppress occurrence of astigmatism and decentration coma.

Further, when the expression (5) is satisfied, an objective lens becomes a thick objective lens whose thickness on the axis is relatively great, thus, working distance in recording/reproducing for CDs tends to be short. However, by providing the first optical path difference providing structure of the present invention to the objective lens, a sufficient working distance in recording/reproducing for CD can be secured sufficiently. Therefore, its effect becomes more remarkable.

Effects of the Invention

According to the present invention, it also becomes possible to provide a die processing method by which a die for molding an objective lens having an optical path difference providing structure used for, for example, an optical pick-up device can be processed with a low cost, a die processed by the above method, an objective lens molded by the above die, and an optical pick-up device using the above objective lens.

BRIEF DESCRIPTION OF THE DRAWINGS

FIG. 5 is a cross-sectional view showing die M and objective lens OBJ formed by resin injection molding in die M or the like.

MODE FOR CARRYING OUT THE INVENTION

Figure 7A:
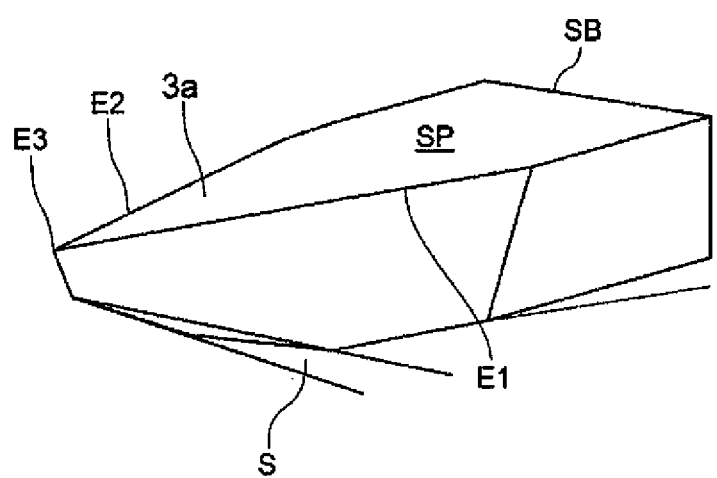
FIG. 7a is a perspective view showing a cutting edge of a diamond tool, that is a cutting tool.
Figure 7B:
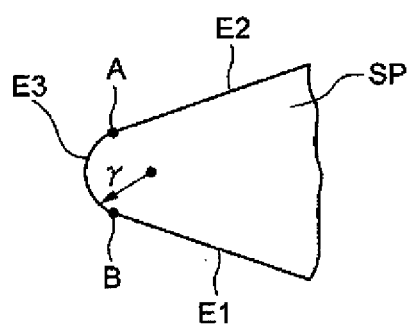
FIG. 7b is an enlarged view showing a tip shape of a cutting face of a cutting tool.

Hereinafter, an embodiment of the present invention is described with reference to figures. FIG. 7a is a perspective view showing a cutting edge of a diamond tool, that is a cutting tool, and FIG. 7b is an enlarged view showing a tip shape of a cutting face of a cutting tool. Sharp point cutting tool SB of a diamond tool is, as it is shown in the figure, brazed to shank S, and has cutting face SP facing the rotation direction of a die to be cut. The tip portion of cutting face SP described above is profiled by linear first edge portion E1, linear second edge portion E2 extending in the direction crossing at an acute angle with first edge portion E1, and arc-like third edge portion E3 connecting tip portions of the edge sides of edge portion E1 and edge portion E2. The radius "f" of third edge portion E3 is set to be 5 μm or less, preferably 2.5 μm or less, but it would be better to set it to be 0.5 μm or more to secure lifetime.

Figure 8:
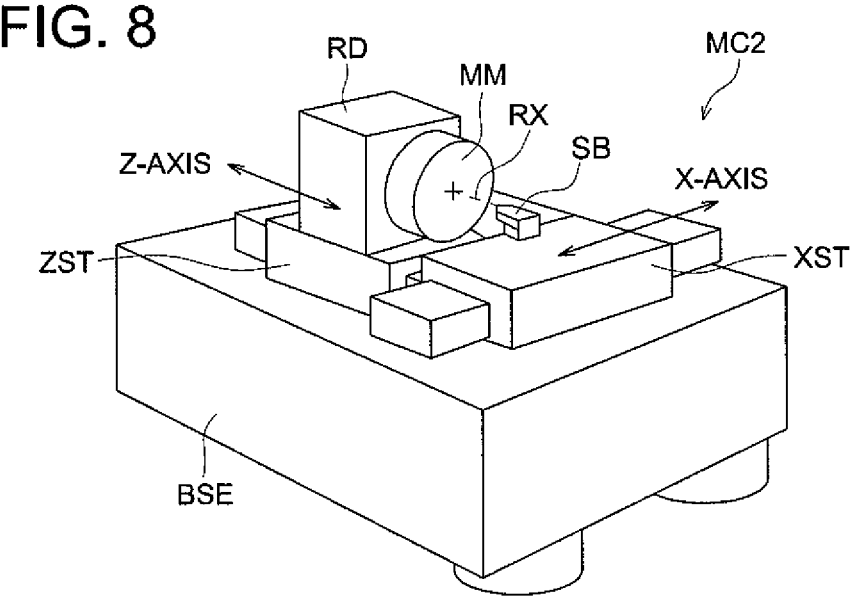
FIG. 8 is a perspective view of a biaxial processing machine.

FIG. 8 is a perspective view of biaxial processing machine MC2 used for a die processing. In FIG. 8, on base BSE arranged on a non-illustrated board, X-axis stage XST which is movable in the X-axis direction, and Z-axis stage ZST which is movable in the Z-axis direction perpendicular to the X-axis direction are arranged. Biaxial processing machine MC2 is arranged in such a way that sharp point cutting tool SB moves in the X-axis direction together with X-axis stage XST with sharp point cutting tool SB being held on X-axis stage XST while third edge portion E3 (FIG. 7b) directing toward die material MM. Biaxial processing machine MC2 is further arranged in such a way that rotation driving section RD moves in the Z-axis direction together with Z-axis stage ZST with rotation driving section RD being held on Z-axis stage ZST. Rotation driving section RD is arranged in such a way that rotation driving section RD holds and rotates die material MM around axis RX extending in the Z-axis direction. In FIG. 8, the die makes a clockwise turn, but may be allowed to make a counterclockwise turn.

(Cutting Processing Example 1)

Figure 1A:
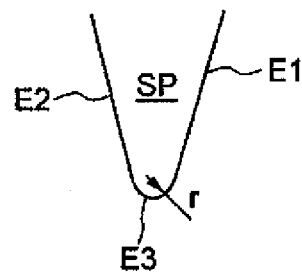
FIGS. 1a and 1b are drawings showing examples of a shape of cutting face of a cutting tool.
Figure 1B:
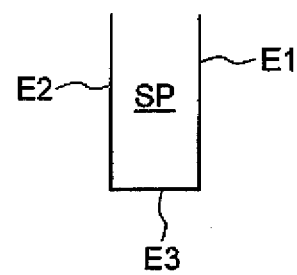
Figure 2:
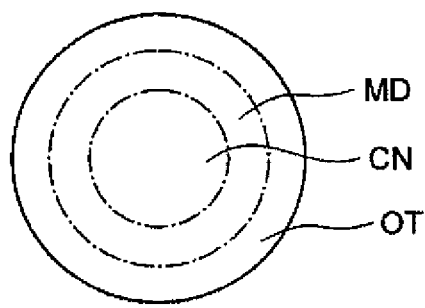
FIG. 2 is a drawing when viewed in the optical axis direction of single objective lens OBJ relating to the present embodiment.
Figure 3:
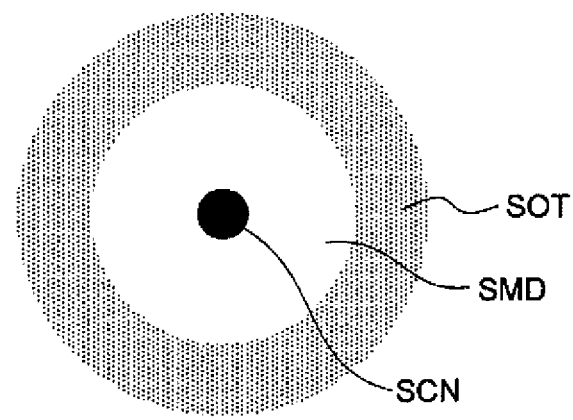
FIG. 3 is a view showing a state of forming a spot which is formed by a third light flux having passed through an objective lens on information recording surface of a third optical disk.
Figure 4A:
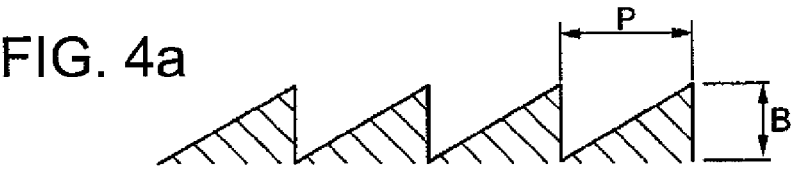
FIGS. 4a-4e are cross-sectional views in the axis direction showing examples of optical path difference providing structures.
Figure 4B:
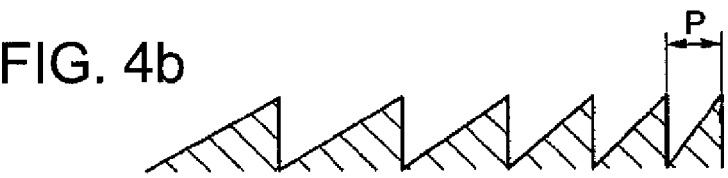
Figure 4C:
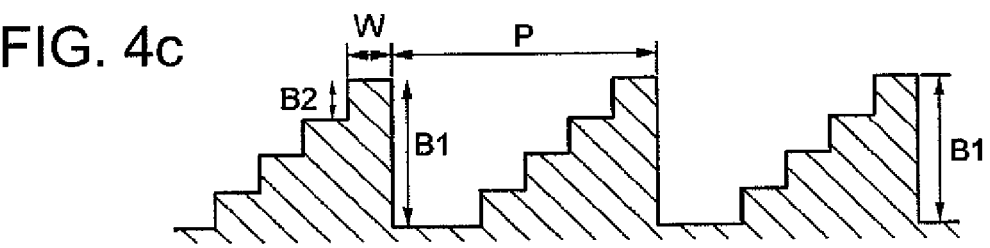
Figure 5:
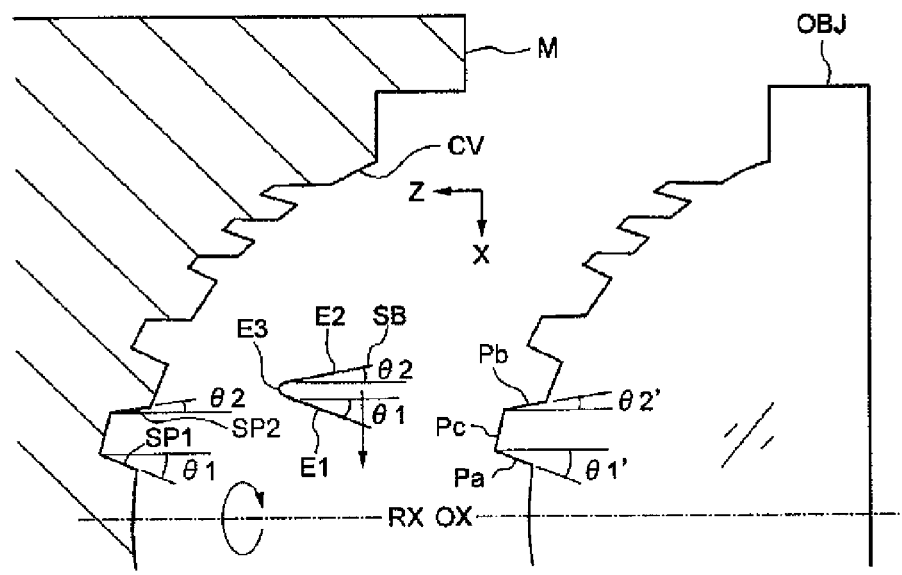
Figure 6:
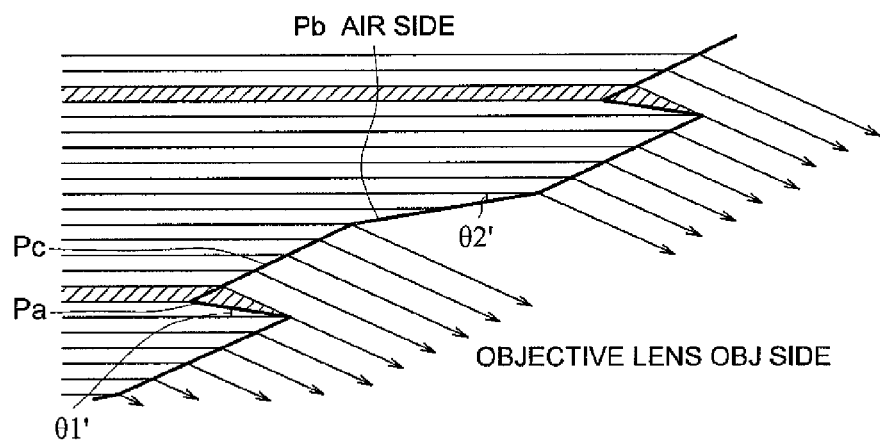
FIG. 6 is an enlarged cross-sectional view when parallel light flux is allowed to enter into a multilevel structure on periphery of objective lens OBJ.

Next, die processing using biaxial processing machine MC2 is described. First of all, cutting processing example 1 for a groove shape corresponding to a multilevel structure as it is shown in FIG. 4c is described, but an example of processing on a parallel flat plate is shown to make the description easy. With reference to FIG. 5, when an angle between first edge portion E1 of sharp point cutting tool SB, the E1 of which is closer to rotation axis RX, and rotation axis RX is set to be θ1, and an angle between second edge portion E2 of sharp point cutting tool SB, the E2 of which is farther from rotation axis RX, and rotation axis RX is set to be θ2, sharp point cutting tool SB is fixed on X-axis stage XST so that θ1 and θ2 become in the following relationship:

$$15° \leq \theta1 \leq 35° \qquad \text{Formula (1)}$$

$$0° \leq \theta2 \leq 15°, \qquad \text{Formula (2)}$$

wherein 1°≤θ2 is preferable.

Figure 9:
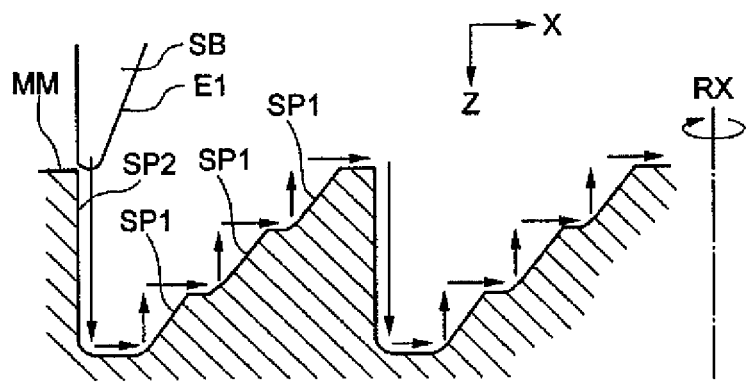
FIG. 9 is a view showing with arrows the relative moving direction of the die and the sharp point cutting tool in cutting processing example 1.

Next, as it is shown in FIG. 9, using Z-axis stage ZST, die material MM is allowed to relatively approach sharp point cutting tool SB, and to locate the tip of sharp point cutting tool SB at an outer part in the perpendicular direction to the axis of the transfer surface to be cut. After that, while rotating die material MM around axis RX by rotation driving section RI), Z-axis stage ZST is allowed to drive, as it is shown by arrows in FIG. 9, and then the tip of sharp point cutting tool SB is allowed to move toward the inside of material MM to cut the material MM. When the cut out is carried out to the necessary position, the driving of Z-axis stage ZST is interrupted, and instead, X-axis stage XST is driven to move sharp point cutting tool SB so as to approach axis RX, and thereby the lowest part of a groove shape is cut out with first edge portion E1. When the cut out is carried out to the necessary position, the driving of X-axis stage XST is interrupted, and instead, Z-axis stage ZST is driven so that sharp point cutting tool SB is moved apart from die MM until the amount of the first step is obtained. After that, the driving of Z-axis stage ZST is interrupted, and instead, X-axis stage XST is driven to move sharp point cutting tool SB so as to approach axis RX, and thereby the first step portion is cut out with first edge portion E1. By repeating the above processes, a groove shape corresponding to the multilevel structure shown in FIG. 9 can be cut out. In the case of cutting processing example 1, among side surfaces of groove-shape extending in the axis RX direction, inner surface SP2 facing axis RX is inclined with respect to axis RX by θ2, but outer surface SP1 opposing the inner surface SP2 is inclined with respect to axis RX by θ1. (In FIG. 9, it is shown an example where θ2 is 0°.)

(Cutting Processing Example 2)

Next, cutting processing example 2 for a groove shape corresponding to the multilevel structure as it is shown in FIG. 4c is described. With reference to FIG. 5, when an angle between first edge portion E1 of sharp point cutting tool SB, the E1 of which is closer to rotation axis RX, and rotation axis RX is set to be θ1, and an angle between second edge portion E2 of sharp point cutting tool SB, the E2 of which is farther from rotation axis RX, and rotation axis RX is set to be θ2, sharp point cutting tool SB is fixed on X-axis stage XST so that θ1 and θ2 become in the following relationship:

$$10° \leq \theta1 \leq 20° \qquad \text{Formula (4)}$$

$$\theta1=\theta2$$

Figure 10:
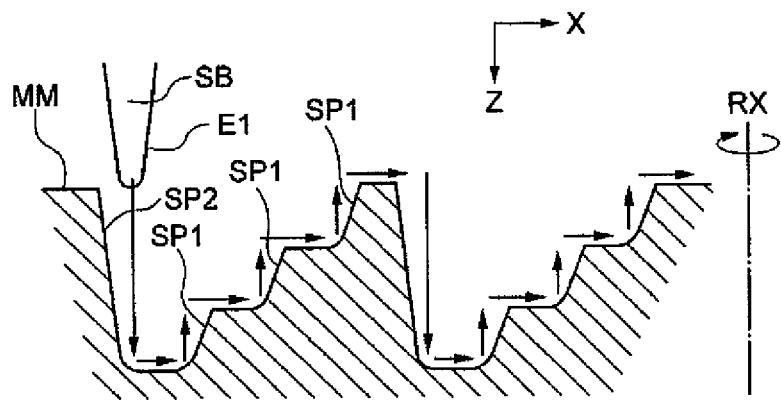
FIG. 10 is a view showing with arrows the relative moving direction of the die and the sharp point cutting tool in cutting processing example 2.

Next, as it is shown in FIG. 10, using Z-axis stage ZST, die material MM is allowed to relatively approach sharp point cutting tool SB, and to locate the tip of sharp point cutting tool SB at an outer part in the perpendicular direction to the axis of the transfer surface to be cut. After that, while rotating die material MM around axis RX by rotation driving section RD, Z-axis stage ZST is allowed to drive, as it is shown by arrows in FIG. 10, and then the tip of sharp point cutting tool SB is allowed to move toward the inside of material MM to cut the material MM. When the cut out is carried out to the necessary position, the driving of Z-axis stage ZST is interrupted, and instead, X-axis stage XST is driven to move sharp point cutting tool SB so as to approach axis RX, and thereby the lowest part of a groove shape is cut out with first edge portion E1. When the cut out is carried out to the necessary position, the driving of X-axis stage XST is interrupted, and instead, Z-axis stage ZST is driven so that sharp point cutting tool SB is moved apart from die MM until the amount of the first step is obtained. After that, the driving of Z-axis stage ZST is interrupted, and instead, X-axis stage XST is driven to move sharp point cutting tool SB so as to approach axis RX, and thereby the first step portion is cut out with first edge portion E1. By repeating the above processes, a groove shape corresponding to the multilevel structure shown in FIG. 10 can be cut out. In the case of cutting processing example 2, among side surfaces of groove-shape extending in the axis RX direction, each of inner surface SP2 facing axis RX and outer surface SP1 opposing the inner surface SP2 is inclined with respect to axis RX in the reverse direction by the same angle ($\theta1=\theta2$).

(Cutting Processing Example 3)

Figure 4D:
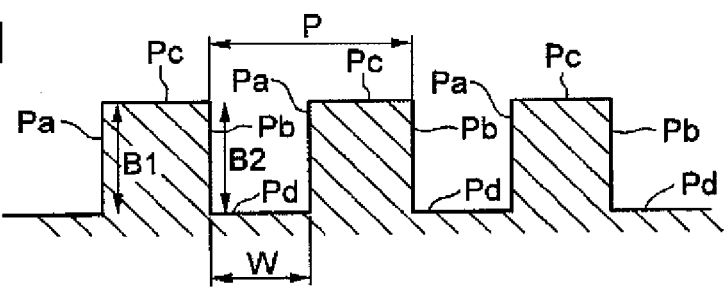
Figure 4E:
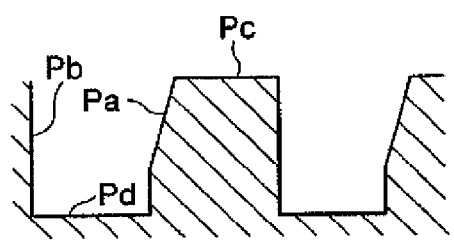

Next, cutting processing example 3 for a groove shape corresponding to the multilevel structure as it is shown in FIG. 4d is described. With reference to FIG. 5, when an angle between first edge portion E1 of sharp point cutting tool SB, the E1 of which is closer to rotation axis RX, and rotation axis RX is set to be $\theta1$, and an angle between second edge portion E2 of sharp point cutting tool SB, the E2 of which is farther from rotation axis RX, and rotation axis RX is set to be $\theta2$, sharp point cutting tool SB is fixed on X-axis stage XST so that $\theta1$ and $\theta2$ become in the following relationship:

$$15° \leq \theta1 \leq 35° \quad \text{Formula (1)}$$

$$0° \leq \theta2 \leq 15°, \quad \text{Formula (2)}$$

wherein $1° \leq \theta2$ is preferable.

Figure 11:
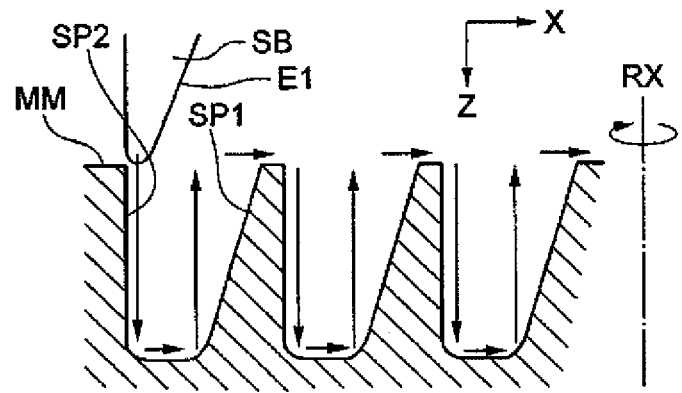
FIG. 11 is a view showing with arrows the relative moving direction of the die and the sharp point cutting tool in cutting processing example 3.

Next, as it is shown in FIG. 11, using Z-axis stage ZST, die material MM is allowed to relatively approach sharp point cutting tool SB, and to locate the tip of sharp point cutting tool SB at an outer part in the perpendicular direction to the axis of the transfer surface to be cut. After that, while rotating die material MM around axis RX by rotation driving section RD, Z-axis stage ZST is allowed to drive, as it is shown by arrows in FIG. 11, and then the tip of sharp point cutting tool SB is allowed to move toward the inside of material MM to cut the material MM by the amount of a step. When the cut out is carried out to the necessary position, the driving of Z-axis stage ZST is interrupted, and instead, X-axis stage XST is driven to move sharp point cutting tool SB so as to approach axis RX, and thereby the bottom part of a groove shape is cut out with first edge portion E1. When the cut out is carried out to the necessary position, the driving of X-axis stage XST is interrupted, and instead, Z-axis stage ZST is driven so that sharp point cutting tool SB is moved apart from die MM by the amount of a step. After that, the driving of Z-axis stage ZST is interrupted, and instead, X-axis stage XST is driven to move sharp point cutting tool SB to the prescribed position so as to approach axis RX. After that, the driving of X-axis stage XST is interrupted, and Z-axis stage ZST is driven to move sharp point cutting tool SB so that the tip of sharp point cutting tool SB is allowed to move toward the inside of material MM to cut the material MM by the amount of a step. By repeating the above processes, a groove shape corresponding to the multilevel structure shown in FIG. 11 can be cut out. In the case of cutting processing example 3, among side surfaces of groove-shape extending in the axis RX direction, inner surface SP2 facing axis RX is inclined with respect to axis RX by $\theta1$, but outer surface SP1 opposing the inner surface SP2 is inclined with respect to axis RX by $\theta2$. (In FIG. 9, it is shown an example where $\theta1$ is 0°.)

(Cutting Processing Example 4)

Next, cutting processing example 4 for a groove shape corresponding to the multilevel structure as it is shown in FIG. 4d is described. With reference to FIG. 5, when an angle between first edge portion E1 of sharp point cutting tool SB, the E1 of which is closer to rotation axis RX, and rotation axis RX is set to be $\theta1$, and an angle between second edge portion E2 of sharp point cutting tool SB, the E2 of which is farther from rotation axis RX, and rotation axis RX is set to be $\theta2$, sharp point cutting tool SB is fixed on X-axis stage XST so that $\theta1$ and $\theta2$ become in the following relationship:

$$10° \leq \theta1 \leq 20° \quad \text{Formula (4)}$$

$$\theta1=\theta2$$

Figure 12:
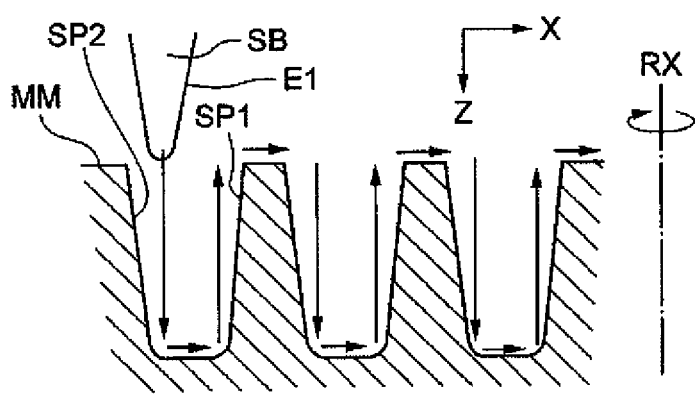
FIG. 12 is a view showing with arrows the relative moving direction of the die and the sharp point cutting tool in cutting processing example 4.

Next, as it is shown in FIG. 12, using Z-axis stage ZST, die material MM is allowed to relatively approach sharp point cutting tool SB, and to locate the tip of sharp point cutting tool SB at an outer part in the perpendicular direction to the axis of the transfer surface to be cut. After that, while rotating die material MM around axis RX by rotation driving section RD, Z-axis stage ZST is allowed to drive, as it is shown by arrows in FIG. 12, and then the tip of sharp point cutting tool SB is allowed to move toward the inside of material MM to cut the material MM by the amount of a step. When the cut out is carried out to the necessary position, the driving of Z-axis stage ZST is interrupted, and instead, X-axis stage XST is driven to move sharp point cutting tool SB forward so as to approach axis RX, and thereby the bottom part of a groove shape is cut out with first edge portion E1. When the cut out is carried out to the necessary position, the driving of X-axis stage XST is interrupted, and instead, Z-axis stage ZST is driven so that sharp point cutting tool SB is moved apart from die MM by the amount of a step. After that, the driving of Z-axis stage ZST is interrupted, and instead, X-axis stage XST is driven to move sharp point cutting tool SB to the prescribed position so as to approach axis RX. After that, the driving of X-axis stage XST is interrupted, and Z-axis stage ZST is driven to move the tip of sharp point cutting tool SB toward the inside of material MM to cut the material MM by the amount of a step. By repeating the above processes, a groove shape corresponding to the multilevel structure shown in FIG. 12 can be cut out. In the case of cutting processing example 4, among side surfaces of groove-shape extending in the axis RX direction, each of inner surface SP2 facing axis RX and outer surface SP1 opposing the inner surface SP2 is inclined with respect to axis RX in the reverse direction by the same angle ($\theta1=\theta2$).

By carrying out the cutting processing in this way, a die of an objective lens can be formed. By carrying out the injection molding of resin using the above die, an objective lens can be formed (refer to FIG. 5).

Figure 13:
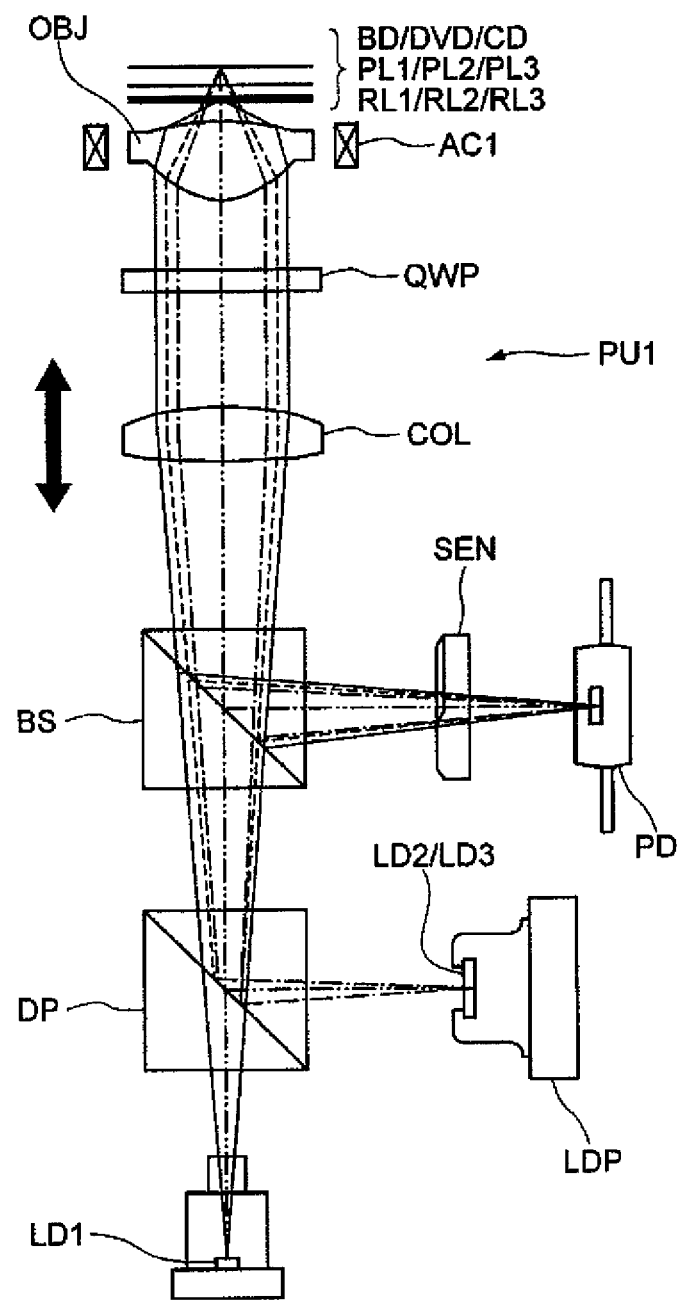
FIG. 13 is a schematic configuration diagram of optical pick-up device 1.

FIG. 13 is a diagram schematically showing optical pickup device PU1 of the present embodiment having an objective lens which is made by transfer molding from a die formed by using the above-described processing method and is capable of recording and/or reproducing information adequately for BDs, DVDs and CDs which are different optical disks. The optical pick-up device PU1 can be mounted in the optical information recording and reproducing apparatus. Herein, the first optical disk is a BD, the second optical disk is a DVD, and the third optical disk is a CD. Hereupon, the present invention is not limited to the present embodiment.

Optical pick-up device PU1 includes objective lens OBJ, quarter wavelength plate QWP, collimation lens COL, polarization beam splitter BS, dichroic prism DP, laser unit LDP, sensor lens SEN, and light-receiving element PD as a light-detecting element. The laser unit LDP includes the first semiconductor laser LD1 (first light source) emitting a laser light flux with a wavelength of 405 nm (the first light flux) when information is recorded/reproduced for BDs, second semiconductor laser LD2 (second light source) emitting a laser light flux with a wavelength of 660 nm (second light flux) when information is recorded/reproduced for DVDs, and third semiconductor laser LD3 (third light source) emitting a laser light flux with a wavelength of 785 mm (third light flux) when information is recorded/reproduced for CDs, which are unitized in one body.

Blue-violet semiconductor laser LD1 emits a first light flux ($\lambda 1$=405 nm) which is a divergent light flux. As illustrated by solid lines, the divergent light flux passes through dichroic prism DP and polarization beam splitter BS, and is converted into a collimated light flux by collimation lens COL. Quarter wavelength plate QWP converts the polarization of the collimated light from linear polarization to circular polarization. Then, the diameter of the resulting light flux is regulated by a stop not illustrated and the light flux enters objective lens OBJ. A light flux converged by the central area, intermediate area, and peripheral area of objective lens OBJ, forms a spot on information recording surface RL1 of a BD through protective substrate PL1 with thickness of 0.1 mm.

The reflected light flux having been modulated by the information pit on the information recording surface RL1 passes through objective lens OBJ and the stop not illustrated again, and quarter wavelength plate QWP converts the polarization of the light flux from circular polarization to linear polarization. Then, collimation lens COL converts the light flux into a convergent light flux. The convergent light flux is reflected by polarization beam splitter BS and is converged on a light-receiving surface of light receiving element PD through sensor lens SEN. Then, information recorded in a BD can be read based on the output signal of light-receiving element PD, by performing focusing and tracking operations for objective lens OBJ using biaxial actuator AC1. When the wavelength changes in the first light flux or when information is recorded/reproduced for BD including a plurality of information recording layers, collimation lens COL as a magnification changing means is displaced in the direction of the optical axis to change a divergent angle or convergent angle of a light flux entering objective optical element OL. Thereby, spherical aberration caused because of the wavelength change or the difference of the information recording layers can be corrected.

Semiconductor laser LD2 in laser unit LDP emits a second light flux ($\lambda 2$=660 nm) which is a divergent light flux. As illustrated by dotted lines, the emitted divergent light flux is reflected by dichroic prism DP and passes through polarization beam splitter BS and collimation lens COL. Then, quarter wavelength plate QWP converts the polarization of the light flux from linear polarization to circular polarization, and the resulting light flux enters objective lens OBJ. Herein, a light flux converged by the central area and the intermediate area of objective lens OBJ (a light flux passing through the peripheral area is formed into flare light to form a peripheral spot portion) becomes a spot formed on information recording surface RL2 of a DVD through protective substrate PL2 with thickness of 0.6 mm, to form a central spot portion.

The reflection light flux having been modulated by the information pit on the information recording surface RL2 passes through objective lens OBJ again, and quarter wavelength plate QWP converts the polarization of the light flux from circular polarization to linear polarization. The resulting light flux is formed into a convergent light flux by collimation lens COL, and reflected by polarization beam splitter BS. Then, the light flux is converged on a light-receiving surface of light-receiving element PD through sensor lens SEN. Then, the information recorded in a DVD can be read by using the output signal of light-receiving element PD.

Semiconductor laser LD3 in laser unit LDP emits a third light flux ($\lambda 3$=785 nm) which is a divergent light flux. As illustrated by long dashed short dashed line, the divergent light flux is reflected by dichroic prism DP, and passes through polarization beam splitter BS and collimation lens COL. Then, quarter wavelength plate QWP converts the polarization of the light flux from linear polarization to circular polarization and the resulting light flux enters objective lens OBJ. Herein, the incident light flux is converged by the central area of objective lens OBJ (a light flux passing through the intermediate area and the peripheral area is formed into a flare light to form a peripheral spot portion) forms a spot on information recording surface RL3 of a CD through protective substrate PL3 with thickness of 1.2 mm.

The reflection light flux having been modulated by the information pit on the information recording surface RL3 passes through objective lens OBJ again, and quarter wavelength plate QWP converts the polarization of the light flux from circular polarization to linear polarization. The resulting light is formed into a convergent light flux by collimation lens COL and reflected by polarization beam splitter BS. Then, the light flux is converged on a light-receiving surface of the light-receiving element PD through sensor lens SEN. Then, information recorded in a CD can be read by using the output signal of the third light-receiving element PD.

Figure 14:
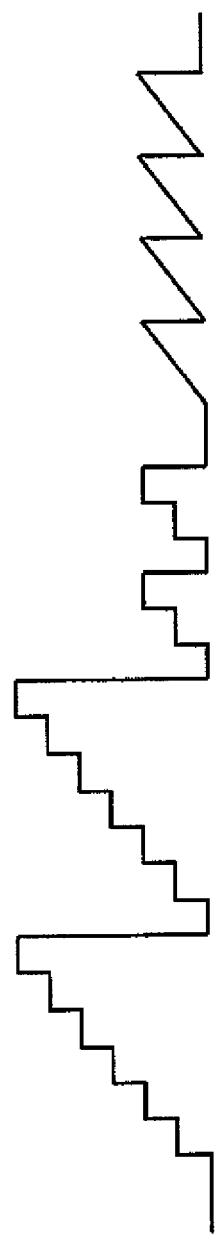
FIG. 14 is an enlarged view showing an example of a diffraction structure of the objective lens relating to the present invention.
Figure 15:
FIG. 15 is an enlarged view showing another example of a diffraction structure of the objective lens relating to the present invention.
Figure 16:
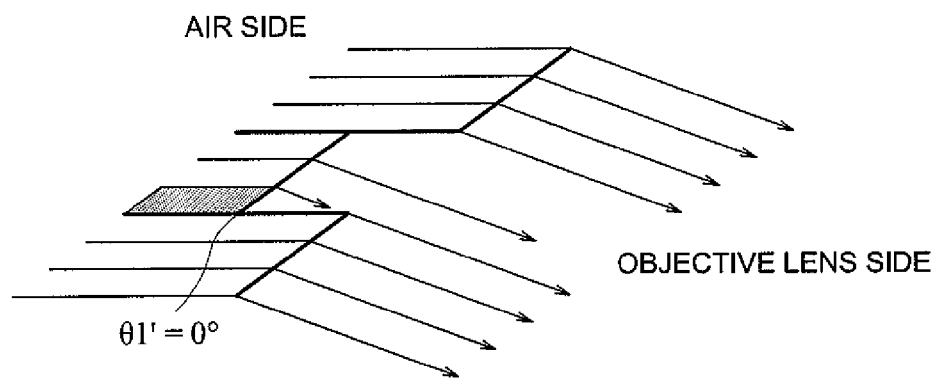
FIG. 16 is an enlarged sectional view when light flux is allowed to enter into a multilevel structure with $\theta1'=0°$.
Figure 17:
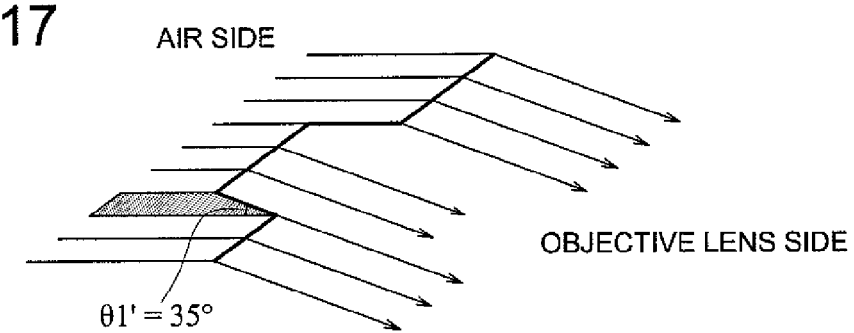
FIG. 17 is an enlarged sectional view when light flux is allowed to enter into a multilevel structure with $\theta1'=35°$.
Figure 18:
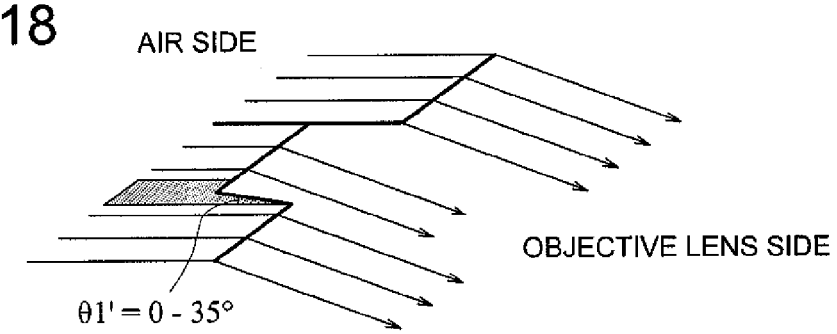
FIG. 18 is an enlarged sectional view when light flux is allowed to enter into a multilevel structure with $\theta1'$ being a value between 0° and 35°.
Figure 19:
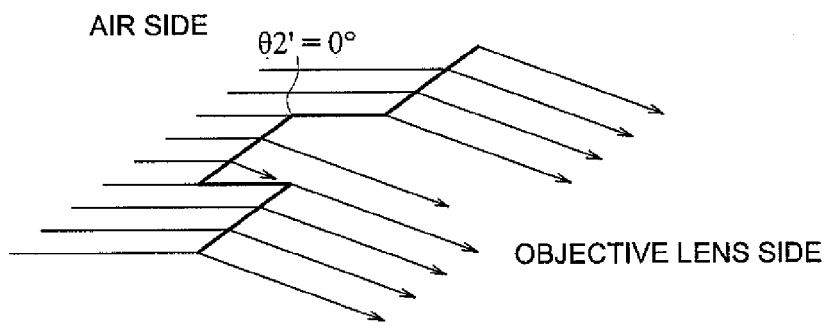
FIG. 19 is an enlarged sectional view when light flux is allowed to enter into a multilevel structure with $\theta2'=0°$.
Figure 20:
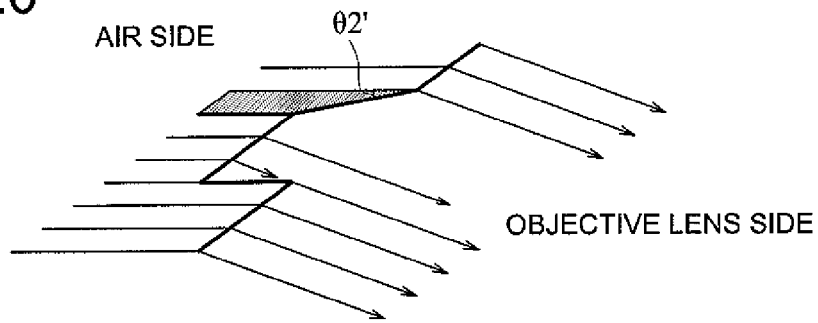
FIG. 20 is an enlarged sectional view when light flux is allowed to enter into a multilevel structure with $\theta2'$ being a large value.

FIG. 14 is a simplified schematic showing an example of a combination between a multilevel structure and a blaze structure of the objective lens relating to the present invention, and FIG. 15 is a simplified schematic showing another example of a combination between a multilevel structure and a blaze structure of the objective lens relating to the present invention. However, the figures show that the structures are formed on a parallel flat board so that the forms of such structures may be more easily understood. In practice, the objective lens is a combination of an aspherical form in addition to the above structures.

DESCRIPTION OF ALPHANUMERIC DESIGNATIONS

AC1: a biaxial actuator
BSE: a base
BS: a polarized beam splitter
CN: a central area
COL: a collimation lens
DP: a dichroic prism
E1: a first edge portion
E2: a second edge portion
E3: a third edge portion
SP2: an inner surface
LD1: a semiconductor laser
LD2: a semiconductor laser
LD3: a semiconductor laser
LDP: a laser unit
M: a die
MC2: a biaxial processing machine MD: an intermediate area
MM: a die material
OBJ: an objective lens
SP1: an outer surface
OT: a peripheral area
OX: an optical axis
PD: a light receiving element
PL1 to PL3: a protective substrate
PU1: an optical pick-up device
Pa: a side surface
Pb: a side surface
Pc: a terrace surface of a light source side
Pd: a terrace surface of an optical disk side
QWP: a quarter wavelength plate
RD: a rotation driving section
RL1 to RL4: an information recording surface
RX: a rotation axis
S: a shank
SB: a sharp point cutting tool
SCN: a central spot portion
SEN: a sensor lens
SMD: an intermediate spot portion
SOT: a peripheral spot portion
XST: an X-axis stage
ZST: a Z-axis stage

What is claimed is:

1. An objective lens used for an optical pick-up device compatible with different types of optical disks and to focus a light flux onto an information recording surface of each of the optical disks, comprising:
at least one optical surface including an optical path difference providing structure,
wherein the objective lens is a plastic lens,
wherein the optical path difference providing structure includes ring-shaped zones,
wherein on a cross section of the objective lens in the optical axis direction, a first slope which is closer to the optical axis in the part of ring-shaped zones inclines so as to deviate from the optical axis as the first slope proceeds to the tip of the part of ring-shaped zones and a second slope which is farther from the optical axis in the part of ring-shaped zones is parallel to the optical axis or inclines so as to get close to the optical axis as the second slope proceeds to the tip of the part of ring-shaped zones,
wherein following formula is satisfied:

$$0° \leq \theta 2' \leq 15°$$ Formula (7)

where $\theta 2'$ is an acute angle between the optical axis and the second slope.

2. The objective lens of claim 1,
wherein on the cross section of the objective lens in the optical axis direction, an acute slope angle $\theta 1'$ between the optical axis and the first slope is larger than $\theta 2'$ in the part of the ring-shaped zones.

3. The objective lens of claim 2,
wherein following is satisfied:

$$15° \leq \theta 1' \leq 35°$$ Formula (6).

4. The objective lens of claim 3,
wherein a following formula is satisfied:

$$1° \leq \theta 2' \leq 15°$$ Formula (8).

5. The objective lens of claim 1,
wherein on the cross section of the objective lens in the optical axis direction, an acute slope angle $\theta 1'$ between the optical axis and the first slope is equal to or nearly equal to $\theta 2'$ in the part of the ring-shaped zones.

6. The objective lens of claim 5,
wherein a following formula is satisfied:

$$10° \leq \theta 1' \leq 20°$$ Formula (9).

7. The objective lens of claim 1,
wherein the optical path difference providing structure comprises two basic structures and the two basic structures are superimposed.

8. The objective lens of claim 1,
wherein a following formula is satisfied, when a thickness of the objective lens along the optical axis and a focal length of the objective lens are set to be d (mm) and f (mm) respectively:

$$0.9 \leq d/f \leq 1.6$$ Formula (5).

9. An optical pick-up device comprising the objective lens of claim 1.

10. The objective lens of claim 1,
wherein the part of ring-shaped zones comprises a terrace surface which is connecting the first slope and the second slope.

11. The objective lens of claim 1,
wherein the light flux passing through the second slope does not converge onto an information recording surface of each of the optical disks.

* * * * *